(12) United States Patent
Lev-Ami et al.

(10) Patent No.: US 7,809,450 B2
(45) Date of Patent: Oct. 5, 2010

(54) SELF-CORRECTING MULTIVARIATE ANALYSIS FOR USE IN MONITORING DYNAMIC PARAMETERS IN PROCESS ENVIRONMENTS

(75) Inventors: Uzi Josef Lev-Ami, Mountain View, CA (US); Lawrence Hendler, Cupertino, CA (US)

(73) Assignee: MKS Instruments, Inc., Andover, MA (US)

( * ) Notice: Subject to any disclaimer, the term of this patent is extended or adjusted under 35 U.S.C. 154(b) by 440 days.

(21) Appl. No.: 11/481,140

(22) Filed: Jul. 5, 2006

(65) Prior Publication Data
US 2007/0021859 A1      Jan. 25, 2007

Related U.S. Application Data

(60) Provisional application No. 60/697,859, filed on Jul. 7, 2005.

(51) Int. Cl.
*G05B 13/02* (2006.01)
(52) U.S. Cl. ..................................................... 700/30
(58) Field of Classification Search ............. 700/28–34, 700/47–54, 108–111
See application file for complete search history.

(56) References Cited

U.S. PATENT DOCUMENTS

| | | | |
|---|---|---|---|
| 5,408,405 A | 4/1995 | Mozumder et al. | 364/151 |
| 5,442,562 A | 8/1995 | Hopkins et al. | 364/468 |
| 5,479,340 A | 12/1995 | Fox et al. | 364/153 |
| 5,544,256 A | 8/1996 | Brecher et al. | 382/149 |
| 5,619,432 A * | 4/1997 | Chandler | 702/189 |
| 5,710,700 A | 1/1998 | Kurtzberg et al. | 364/149 |
| 5,949,678 A | 9/1999 | Wold et al. | 364/188 |
| 6,061,640 A * | 5/2000 | Tanaka et al. | 702/81 |
| 6,153,115 A | 11/2000 | Le et al. | 216/60 |
| 6,354,145 B1 * | 3/2002 | Fransson et al. | 73/61.52 |

(Continued)

FOREIGN PATENT DOCUMENTS

DE      101 14 211 A1      11/2001

(Continued)

OTHER PUBLICATIONS

International Search Report for International Application No. PCT/US2006/026236, date of mailing Dec. 29, 2006.

(Continued)

*Primary Examiner*—M. N. Von Buhr
(74) *Attorney, Agent, or Firm*—Proskauer Rose LLP

(57) ABSTRACT

A method and apparatus for process monitoring are provided. Process monitoring includes (i) generating a multivariate analysis reference model of a process environment from data corresponding to monitored parameters of the process environment; (ii) designating at least one of the monitored parameters as being correlated to maturation of the process environment; (iii) collecting current process data corresponding to the monitored parameters, including the at least one designated parameter; and (iv) scaling the multivariate reference model based on the current process data of the at least one designated parameter to account for maturation of the process environment. The method further includes generating one or more current multivariate analysis process metrics that represent a current state of the process environment from the current process data; and comparing the current process metrics to the scaled reference model to determine whether the current state of the process environment is acceptable.

20 Claims, 11 Drawing Sheets

U.S. PATENT DOCUMENTS

| | | | |
|---|---|---|---|
| 6,442,445 B1 | 8/2002 | Bunkofske et al. | 700/108 |
| 6,456,899 B1 | 9/2002 | Gleason et al. | 700/212 |
| 6,556,884 B1 | 4/2003 | Miller et al. | 700/121 |
| 6,564,119 B1* | 5/2003 | Vaculik et al. | 700/146 |
| 6,584,368 B2 | 6/2003 | Bunkofske et al. | 700/83 |
| 6,594,620 B1* | 7/2003 | Qin et al. | 702/185 |
| 6,607,577 B2* | 8/2003 | Vaculik et al. | 75/375 |
| 6,678,569 B2 | 1/2004 | Bunkofske et al. | 700/108 |
| 6,721,616 B1 | 4/2004 | Ryskoski | 700/108 |
| 6,830,939 B2 | 12/2004 | Harvey et al. | 438/8 |
| 6,876,931 B2* | 4/2005 | Lorenz et al. | 702/22 |
| 6,975,944 B1* | 12/2005 | Zenhausern | 702/22 |
| 7,107,491 B2* | 9/2006 | Graichen et al. | 714/37 |
| 7,151,976 B2* | 12/2006 | Lin | 700/108 |
| 7,191,106 B2* | 3/2007 | Minor et al. | 703/2 |
| 7,289,835 B2* | 10/2007 | Mansfield et al. | 600/316 |
| 2002/0010566 A1* | 1/2002 | Chester et al. | 703/2 |
| 2002/0038926 A1 | 4/2002 | Vaculik et al. | 266/90 |
| 2003/0065462 A1 | 4/2003 | Potyrailo | 702/81 |
| 2004/0055888 A1 | 3/2004 | Wikiel et al. | 205/81 |
| 2004/0083065 A1 | 4/2004 | Daniel et al. | 702/35 |
| 2004/0116814 A1 | 6/2004 | Stranc et al. | 600/473 |
| 2004/0122859 A1 | 6/2004 | Gavra et al. | 707/104.1 |
| 2004/0228186 A1 | 11/2004 | Kadota | 365/202 |
| 2005/0028932 A1 | 2/2005 | Shekel et al. | 156/345.15 |
| 2005/0037515 A1 | 2/2005 | Nicholson et al. | 436/173 |
| 2005/0045821 A1 | 3/2005 | Noji et al. | 250/311 |
| 2005/0060103 A1 | 3/2005 | Chamness | 702/30 |
| 2005/0130321 A1 | 6/2005 | Nicholson et al. | 436/518 |
| 2005/0251276 A1 | 11/2005 | Shen | 700/108 |

FOREIGN PATENT DOCUMENTS

| | | |
|---|---|---|
| DE | 100 40 731 A1 | 3/2002 |
| WO | WO 2004/046835 A2 | 6/2004 |

OTHER PUBLICATIONS

Notification Concerning Transmittal of International Preliminary Report on Patentability (Chapter I of the Patent Cooperation Treaty), Date of Mailing Jan. 17, 2008, (8 total pages).

"Hotelling's T squared," Engineering Statistics Handbook [online], [retrieved on Jan. 13, 2006]. Retrieved from the Internet <URL: http://www.itl.nist.gov/div898/handbook/pmc/section5/pmc543.htm> (2 pages).

"Pearson's Correlation Coefficient," Teach/Me Data Analysis [online], [retrieved on Dec. 9, 2005]. Retrieved from the Internet <URL: http://www.vias.org/tmdatanaleng/cc_corr_coeff.html> referring to Lohninger, H. *Teach/Me Data Analysis*, Berlin-NY-Tokyo, Springer-Verlag, 1999. ISBN 3-540-14743-8 (2 pages).

Smith, John A. et al. "Practical, Real-Time Multivariate FDC" [online], Dec. 1, 2004 [retrieved on Dec. 16, 2005]. Retrieved from the Internet <URL: http://www.reed-electronics.com/semiconductor/index.asp?layout=articlePrint&articleID=CA483628> (6 pages).

Goodlin et al., "Simultaneous Fault Detection and Classification for Semiconductor Manufacturing Tools," 201st Meeting of the Electrochemical Society, International Symposium on Plasma Processing XIV, Abs. 413, Philadelphia, PA, May 2002 (16 pages).

Goodlin et al., "Simultaneous Fault Detection and Classification for Semiconductor Manufacturing Tools," Journal of the Electrochemical Society, 150 (12) G778-G784 (2003).

Gallagher et al., "Development and Benchmarking of Multivariate Statistical Process Control Tools for a Semiconductor Etch Process: Improving Robustness through Model Updating," Eigenvector Research, Inc., (6 pgs.) first viewed at least Sep. 9, 2004.

Chen et al., "Plasma Etch Modeling using Optical Emission Spectroscopy," J. Vac. Sci. Technol. A 14(3), May/Jun. 1996 (pp. 1901-1906).

Lymberopoulos et al., "Advanced Process Control Comes of Age," Jul. 1, 2004 http://www.reed-electronics.com/semiconductor/index.asp?layout=articlePrint&article ID=... (pp. 1-6).

Skumanich et al., "Advanced Etch Applications Using Tool-Level Data," Copyright 2005, PennWell Corporation, http://sst.pennet.com/articles/article_display.cfm?section=archi&article_id=206470&vers..., Jun. 2004 (pp. 1-7).

Mason et al., "Applying Hotelling's $T^2$ Statistic to Batch Processes," Journal of Quality Technology, vol. 33, No. 4, Oct. 2001 (pp. 466-479).

Smith et al., "Process Leaps Without New Hardware," European Semiconductor, The Source for Europe, Middle East and Africa, www.eurosemi.eu.com, Nov. 2004 (4 pages).

"TOOLweb Blue Box Professional: Enabling High Speed, Multi-User Connectivity and Data Sharing," Control & Information Technology, www.mksinst.com, Mar. 2005 (4 pages).

"TOOLweb SenseLink: Web-Enables Existing Sensors," Control & Information Technology, www.mksinst.com, Dec. 2004 (4 pages).

"TOOLweb: APC & e-Diagnostics Suite," Control & Information Technology, www.mksinst.com, Nov. 2004 (4 pages).

"TOOLweb Applications Support: AEC/APC Applications Engineering, Integration and Deployment Support," Control & Information Technology, www.mksinst.com, Sep. 2005 (4 pages).

Smith et al., "From Sensor Data to Process Control: A Networked Framework," Semiconductor Manufacturing Magazine, Jul. 2004 (6 pages).

Wold et al., "Modeling and Diagnostics of Batch Processes and Analogous Kinetic Experiments," Chemometrics and Intelligent Laboratory Systems 44 (1998) (pp. 331-340).

Martin et al., "Multivariate Statistical Process Control and Process Performance Monitoring," *IFAC Dynamics and Control of Process Systems*, 1998, pp. 347-356.

Kresta et al., "Multivariate Statistical Monitoring of Process Operating Performance," *The Canadian Journal of Chemical Engineering*, vol. 69, Feb. 1991, pp. 35-47.

"User's Guide to SIMCA-P, SIMCA-P+," *By Umetrics AB*, Version 11.0, May 17, 2005.

* cited by examiner

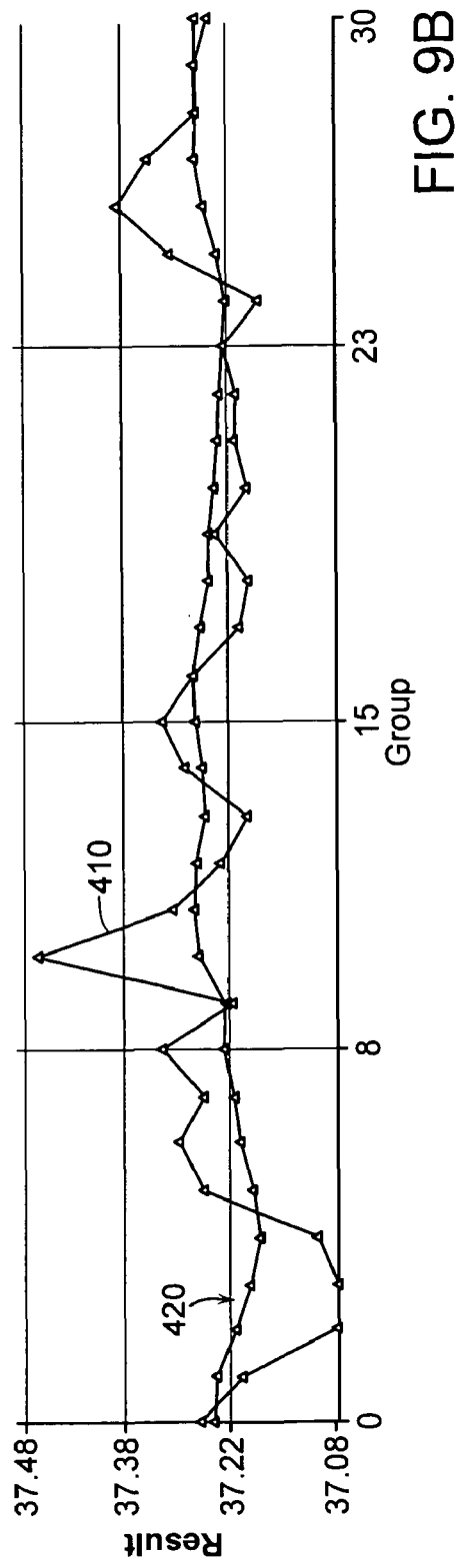
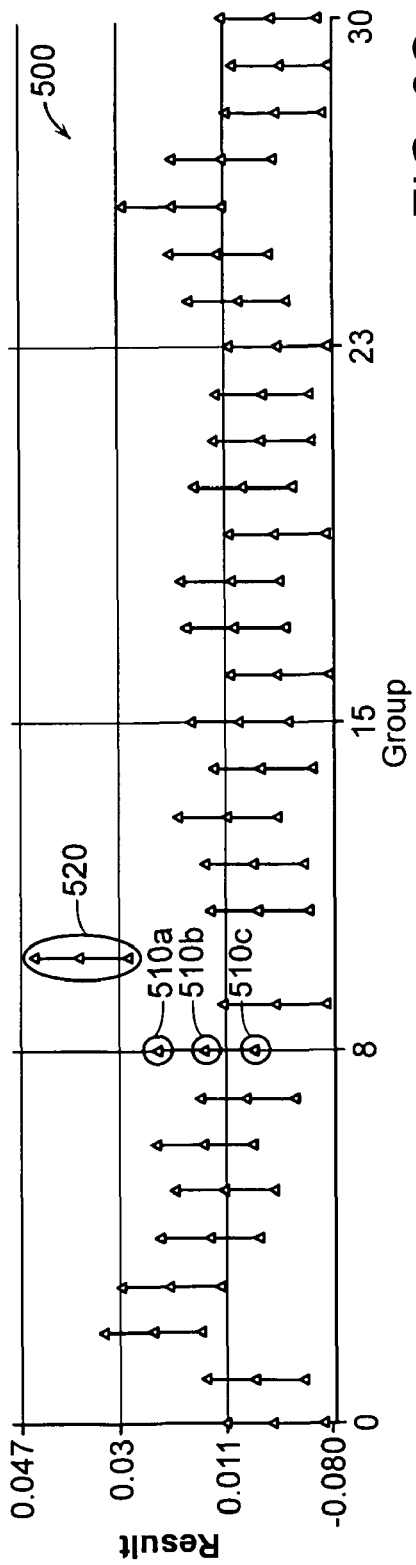

SELF-CORRECTING MULTIVARIATE ANALYSIS FOR USE IN MONITORING DYNAMIC PARAMETERS IN PROCESS ENVIRONMENTS

RELATED APPLICATIONS

This application claims the benefit of U.S. Provisional Application No. 60/697,859, filed on Jul. 7, 2005. The entire teachings of the above application are incorporated herein by reference.

BACKGROUND

Multivariate analysis (MVA) has proven to be an effective tool in process monitoring involving a large number of monitored parameters, and in particular for fault detection. Multivariate analysis detects process changes seen in parameter covariance and correlation. MVA typically requires the construction of a process reference model based on known acceptable working conditions that serve as a reference.

The reference model can be constructed from measured process parameters. In general, the model can be broken down into individual time-dependent models for the individual process steps, and then reconstructed into an upper level model summarizing the overall process.

All subsequent implementations of fault detection for the process compare the same measured parameters in the same fashion (i.e., modeling process steps and summarizing into an upper level model) and determine statistically significant deviations from the known acceptable processes upon which the reference model is based. Effective implementation of MVA depends in large part on the quality of the model.

SUMMARY

Processes that can benefit from fault detection using MVA are generally dynamic in nature. Over time, the performance of a process usually drifts due to aging. For example, in semiconductor processes, deposits on the chamber wall can result in differences in the internal RF field distribution that might affect the nature of the plasma involved in the process. Thus, as the process naturally matures, the MVA reference model becomes less effective in detecting defects, because the model considers the new working conditions as statistically significantly different from the model, failing to factor in process aging, or maturation.

Effective implementation of MVA on processes that mature over time requires the definition of a mechanism to recognize shifts in a process due to maturation as compared to shifts in the process due to process deviations. As shown in the example of FIG. 1, process maturation typically follows some standard pattern that repeats itself in a cycle coinciding with periodic maintenance. The MVA results illustrate process aging as a maturation path in the form of an idealized ramp. Other processes may have difference characteristic maturation paths, but the specific contour of the path is immaterial.

FIG. 2 is a diagram of process maturation for illustrating a method of generating a MVA reference model to account for process aging according to the prior art. In particular, one method involves creating a reference model that accounts for process maturation includes the selection of process samples across a single cycle. For example, referring to FIG. 2, data samples selected at points $5a, 5b, \ldots 5n$ (collectively 5) along the process maturation path can be used to create a reference model that would not cause process alarms (or failure indications) along subsequent maturation paths, even when the process restoration is not ideal. A disadvantage of such a model is that an event defined by the excursion shown at point $5c$ would likely not be identified as a defect although it should be.

Another known modeling solution is periodic updates to the reference model used for fault detection. However, this solution would require a large number of models requiring frequent maintenance performed at the expense of normal process time. While the MVA fault detection would be robust to both the process drift and normal defects, the implementation of MVA would require significant human intervention and can lead to the potential for human error concerning implementation of the next model update.

The present invention is directed to a method that incorporates the nature of the process itself as a self-correcting mechanism to a multivariate analysis of the process. Frequently, in processes, such as those in which process maturation results in drift in the MVA results, individual process parameters can be identified that correlate with the MVA drift results. For example, as a semiconductor process matures, etch rate of wafers may be identified as a parameters that changes in a correlated fashion. As another example, as a semiconductor process matures, the gas flow rate might change due to deposits in the gas orifice.

Parameters that correlate with process maturation can be defined within the MVA model as "initial conditions". These initial conditions can be used to inform the model as to the current state of the process along its maturation curve. Each time the process is monitored, the MVA model evaluates the correlated parameter from the previous process event to determine where along the process maturation path the process finds itself. The MVA modeler can then adjust the control thresholds of the MVA to compensate for the actual process drift. In that fashion, the model is able to differentiate between an excursion from the normal operating conditions and a change in operating conditions due to a known maturation process.

The nature of the maturation curve is immaterial, as long as the maturation curve is characteristic of the process and process parameters are found that correlate with the maturation curve. Implementation of initial conditions allows the MVA model to self adjust to current maturation conditions, while maintaining its ability to identify process deviations from normal process conditions. Using initial conditions to maintain model robustness removes the need for frequent model updates and from the need to maintain frequent model version control.

According to one aspect, the invention features a method and an apparatus for process monitoring, including the steps of, or structure for, generating a multivariate analysis reference model of a process environment from data corresponding to monitored parameters of the process environment; identifying at least one of the monitored parameters as being correlated to maturation of the process environment; collecting current process data corresponding to the monitored parameters, including the at least one identified parameter; and scaling the multivariate reference model based on the current process data of the at least one identified parameter to account for maturation of the process environment.

Particular embodiments further comprise the step of, or structure for, weighting the at least one identified parameter used in scaling the multivariate reference model.

Particular embodiments further comprise the step of, or structure for, generating one or more current multivariate analysis process metrics that represent a current state of the process environment from the current process data; and comparing the one or more current process metrics to the scaled reference model to determine whether the current state of the process environment is acceptable.

Particular embodiments further comprise the step of, or structure for, generating a metric value and a set of threshold values about the metric that represent the state of the process environment, the set of threshold values defining a range of acceptable metric values associated with subsequent states of the process environment.

Particular embodiments further comprise the step of, or structure for, scaling the set of threshold values of the reference model based on the current process data of the at least one identified parameter to account for maturation of the process environment.

Particular embodiments further comprise the step of, or structure for, generating one or more current multivariate analysis process metrics that represent a current state of the process environment from the current process data; and comparing the one or more current multivariate analysis process metrics to the scaled set of threshold values to determine whether the current state of the process environment is acceptable.

According to another aspect, the invention features a method and an apparatus for process monitoring, including the steps of, or structure for, generating a multivariate analysis reference model of a semiconductor process chamber from data corresponding to monitored parameters of the semiconductor process chamber; identifying at least one of the monitored parameters as being correlated to maturation of the semiconductor process chamber; collecting current process data corresponding to the monitored parameters of the process chamber, including the at least one identified parameter; and scaling the multivariate reference model based on the current process data of the at least one identified parameter to account for maturation of the semiconductor process chamber.

Particular embodiments further comprise the step of, or structure for, weighting the at least one identified parameter used in scaling the multivariate reference model.

Particular embodiments further comprise the step of, or structure for, generating one or more current multivariate analysis process metrics that represent a current state of the semiconductor process chamber from the current process data; and comparing the one or more current multivariate analysis process metrics to the scaled reference model to determine whether the current state of the process environment is acceptable.

BRIEF DESCRIPTIONS OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9B is a chart of an exponentially weighted moving average (EWMA) signal for a sample of the selected process parameter values of FIG. 9A.

FIG. 9C is a graph illustrating the change in the selected process parameter from wafer to wafer.

DETAILED DESCRIPTION

The present invention features a method of self-correcting multivariate analysis for use in monitoring dynamic parameters in a process environment. For purposes of example, an embodiment of the invention is described for use in semiconductor process environments. One skilled in the art will readily recognize other process environments in which embodiments of the invention can also be readily applied.

In a typical semiconductor process, a series of silicon wafers pass through a process chamber for the purpose of material deposition, etching or other processing steps. For such processes, multivariate analysis can be used to evaluate the quality of a processed wafer based on characteristics of the process environment as opposed to characteristics of the wafer itself. To accomplish such analysis, a reference model of the process environment is generated using MVA. The MVA reference model is used as a basis for determining whether subsequent process environment states and consequently subsequently processed wafers meet the standards of acceptability. An advantage of the present invention is that a set of process parameters identified as "initial conditions" correlate to the aging of the process. Thus, instead of generating a plurality of reference models or a single generalized reference model that is relatively inefficient and ineffective for fault detection, a single reference model can be generated and subsequently scaled based on values of the initial condition parameters to account for process aging. Scaling includes any analytical adjustment based on the initial conditions.

Figure 3:
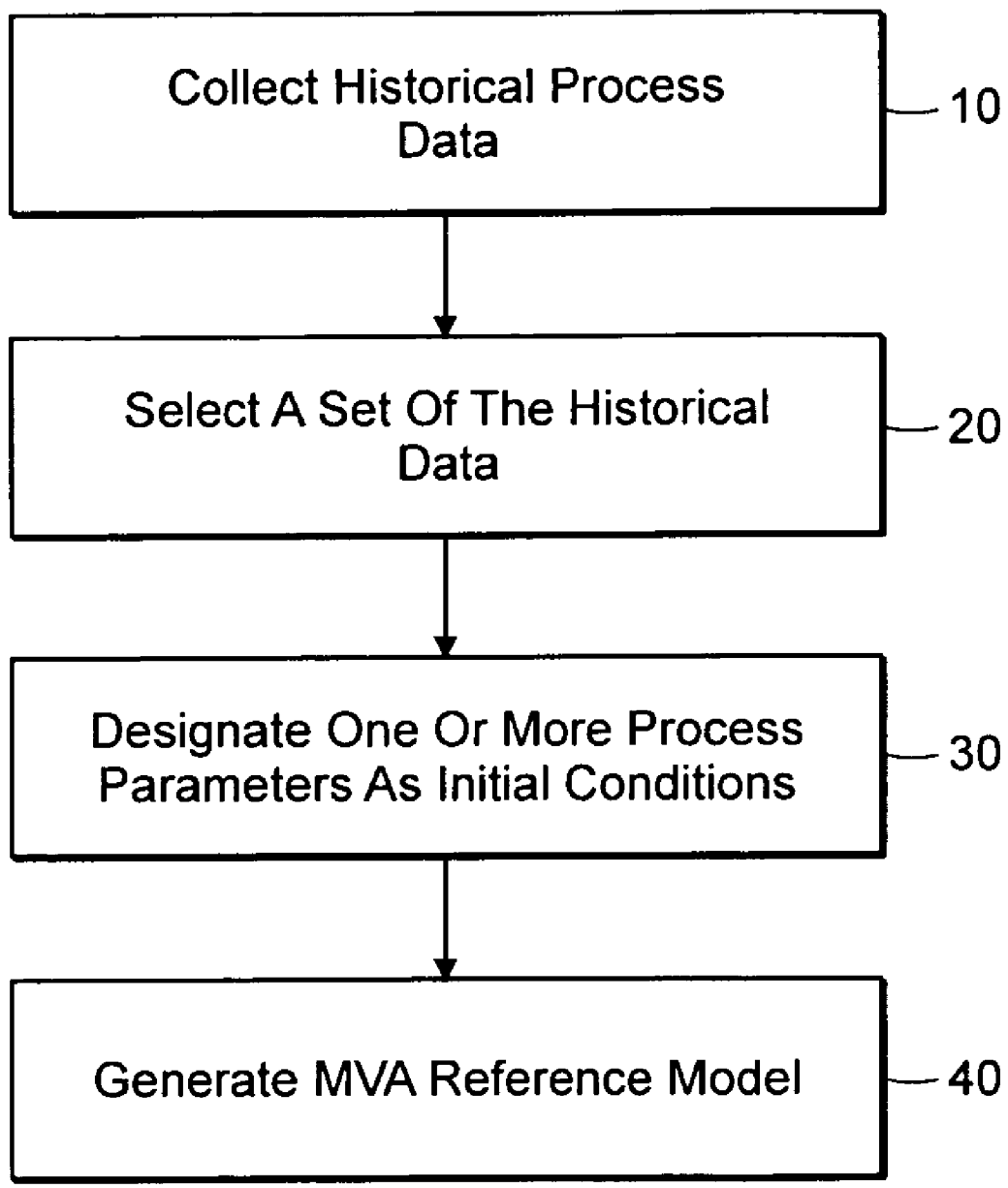
FIG. 3 is a flow chart illustrating a method for generating a reference MVA model according to one embodiment.

FIG. 3 is a flow chart illustrating a method for generating a reference MVA model. At step 10, historical data is collected on monitored parameters of the process environment. For example, in a semiconductor process, the monitored parameters can include any one or more of wafer identification ("wafer ID"), etch rate, gas flow rate, pressure, RF power, mass spectrometry data, infrared spectrometry, temperature, and other parameters that describe the physical properties of the process chamber and the process. Such data can be collected for a series of wafer processing and organized according to wafer ID.

At step 20, a set of the historical data is selected for use in generating the MVA reference model. In a semiconductor process, the selected historical data includes only data that corresponds to wafers deemed acceptable through external testing of the processed wafers. For example, if historical data is collected for 50 wafers in which only 45 are deemed acceptable, the set of historical data is limited to data corresponding to the 45 acceptable wafers.

At step 30, one or more monitored parameters are designated as "initial conditions" for use in generating the model. An initial condition is a monitored parameter of the process that correlates to the normal aging, or maturation, of that process. Thus, as the process matures, the initial reference model can be corrected by scaling the model based on the changes in the values of the initial condition parameters. In other words, an initial condition indicates the state of the process maturation along its maturation path. The determination of the initial condition parameters can be made based on knowledge of the particular process or through empirical analysis of the monitored parameters over the life cycle of the process. For example, in a semiconductor process, the initial conditions may include etch rate and/or gas flow rate.

At step 40, an MVA reference model is generated based on the selected historical data and the designated initial condition(s). Generation of models using multivariate analysis of data in general is known in the art. The resulting MVA reference model condenses the historical data for a large number of process parameters into a smaller set of independent abstract metrics (e.g., MVA results) that are representative of an acceptable process environment. Each abstract metric is further associated with a set of control threshold values defining a range of acceptable metric values deviating from the reference value. These threshold values are used as the basis for determining whether subsequent process environments, and consequently subsequently processed wafers, meet the standards for acceptability.

Figure 4:
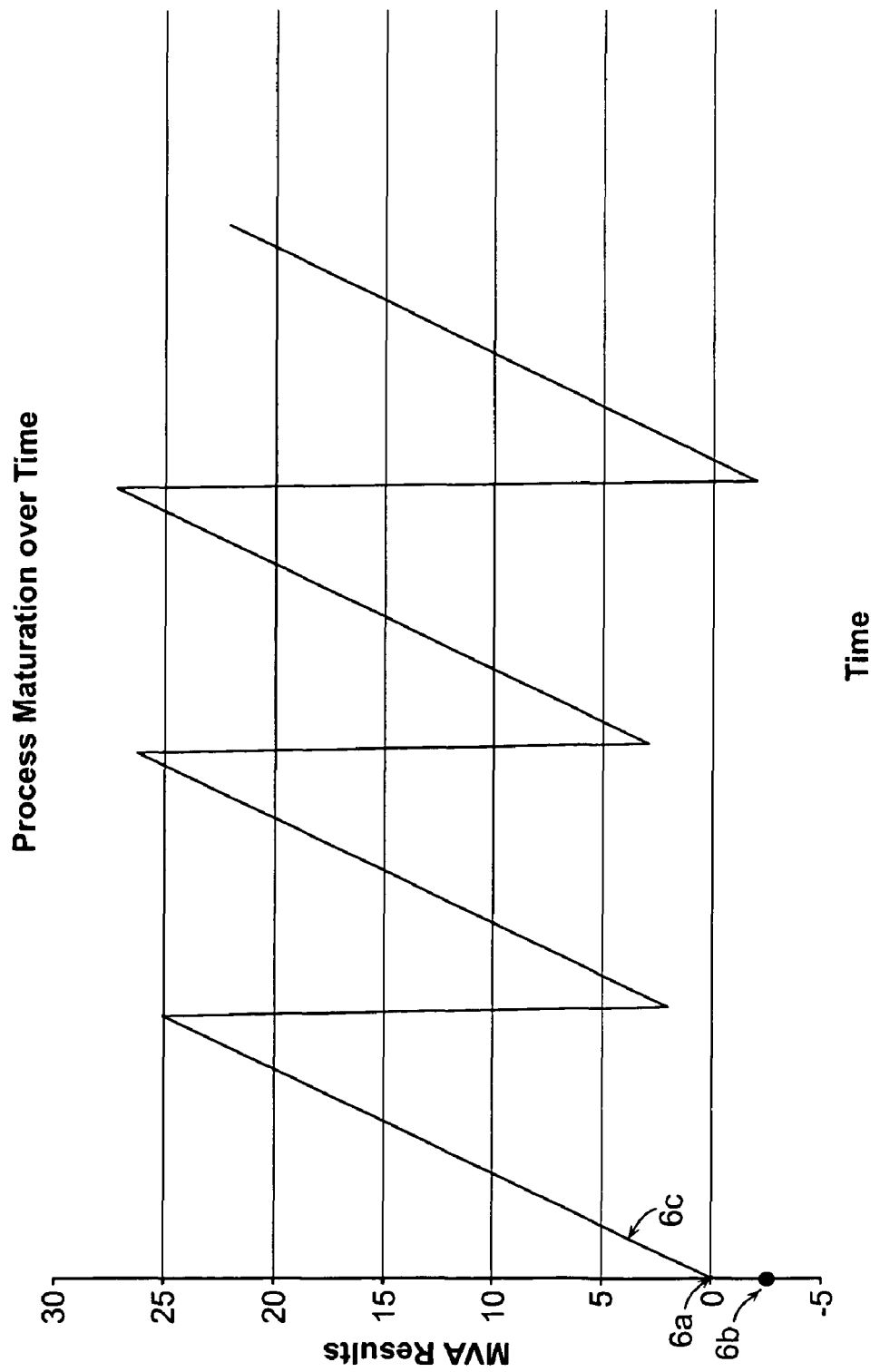
FIG. 4 is a state diagram illustrating process maturation and the corresponding MVA results and threshold values of an initial reference model according to one embodiment.

For example, FIG. 4 is a state diagram illustrating process maturation and the corresponding MVA results and threshold values of an initial reference model according to one embodiment. Specifically, MVA result 6a is an exemplary metric of the reference model, while MVA results 6b and 6c are the defined thresholds corresponding to a range of acceptable MVA results for subsequently modeled states of the process environment.

According to one embodiment, the MVA reference model can be generated using MVA software SIMCA P+ or SIMCA QM+ from UMetrics with headquarters in Umeå, Sweden. Other multivariate analysis software, hardware or other techniques known in the art can also be used. Once the reference model is provided, it can be used to evaluate the current state of the process environment.

Figure 5:
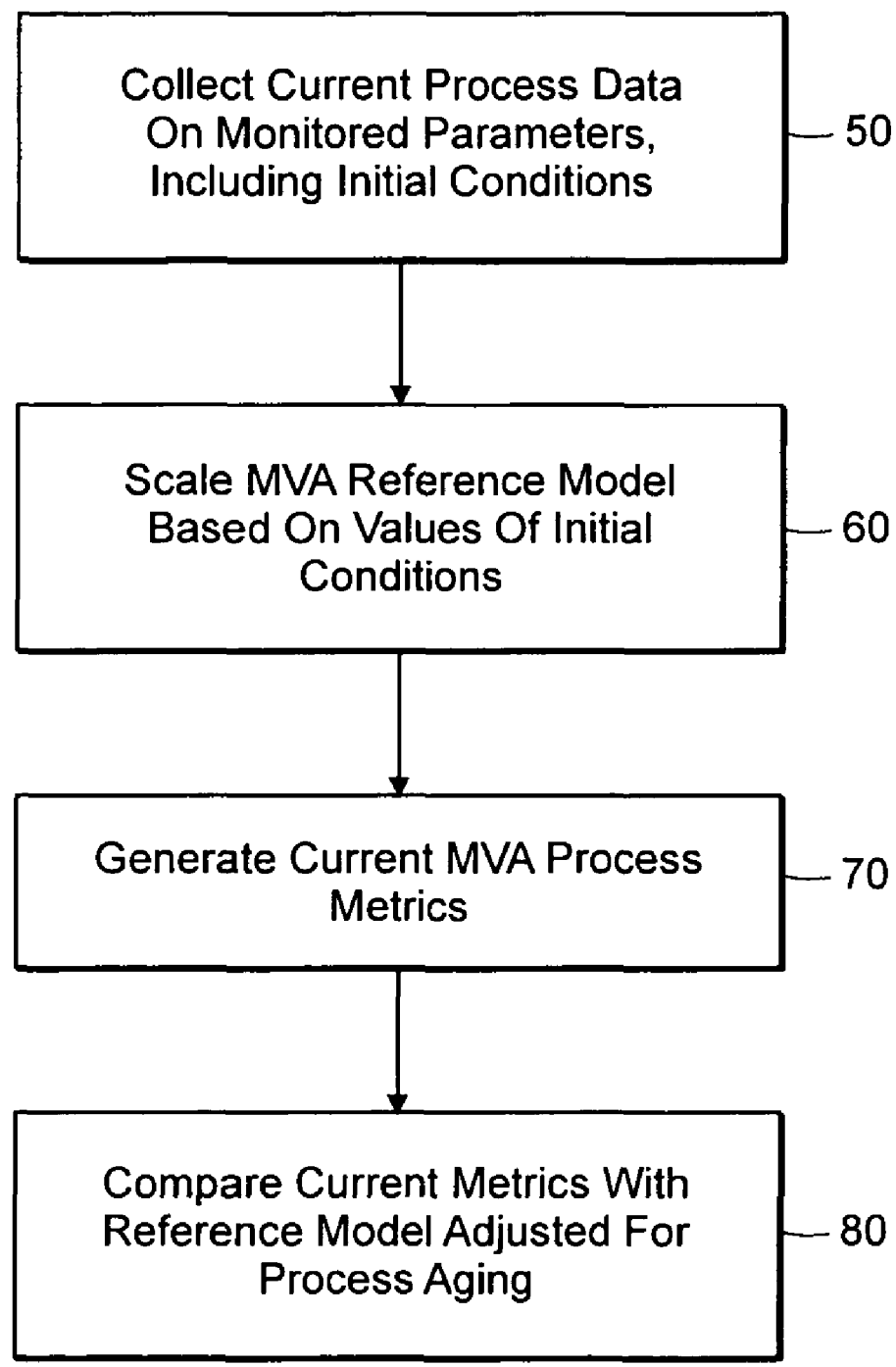
FIG. 5 is a flow diagram illustrating a method for analyzing the current state of a process environment using a MVA reference model according to one embodiment.

FIG. 5 is a flow diagram illustrating a method for analyzing the current state of a process environment using a MVA reference model according to one embodiment.

At step 50, current data is collected on monitored parameters of the processing environment. The monitored parameters are preferably the same as the parameters monitored for generated the reference model except in this instance the data is collected for a single processing event. For example, in a semiconductor process, the data is collected for processing a single wafer (e.g., etching or material deposition). The monitored parameters also include the one or more parameters previously designated as "initial conditions" parameters.

At step 60, the control threshold values of the MVA reference model are scaled relative to the collected data for the initial condition parameters. As previously discussed, the initial condition parameters correlate to the natural aging or maturation of the process. In other words, the process, and thus the MVA reference model, ages along its maturation path as the one or more initial conditions change. Therefore, instead of having to create new reference models according to process aging, the original reference model can simply scale its control threshold values for each abstract metric. The control threshold values can be scaled relative to the actual value of the initial condition parameter or relative to a derived value based on the actual values of the initial condition parameters to account for the natural aging of the process.

Figure 1:
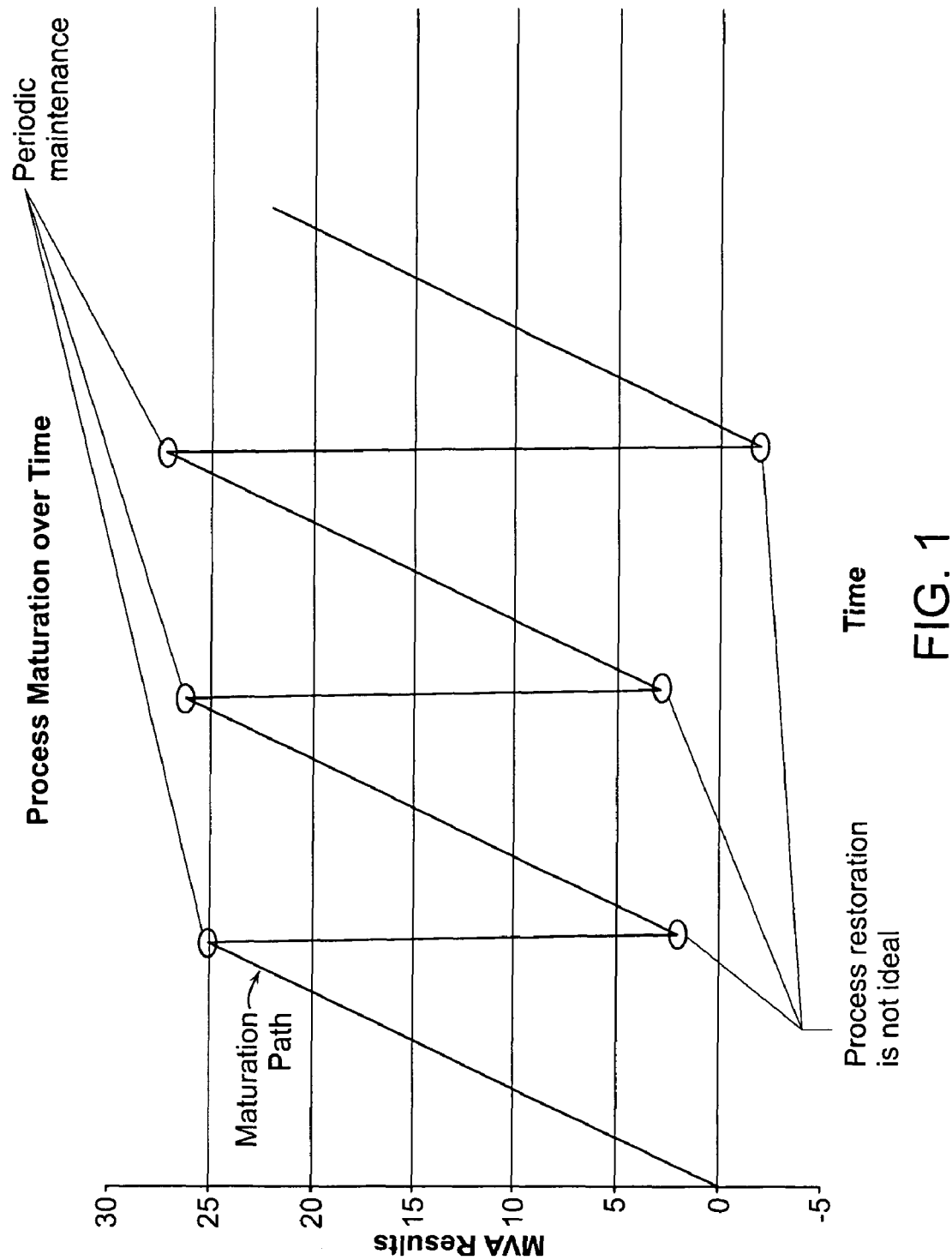
FIG. 1 is a diagram illustrating the cyclical nature of process maturation.
Figure 2:
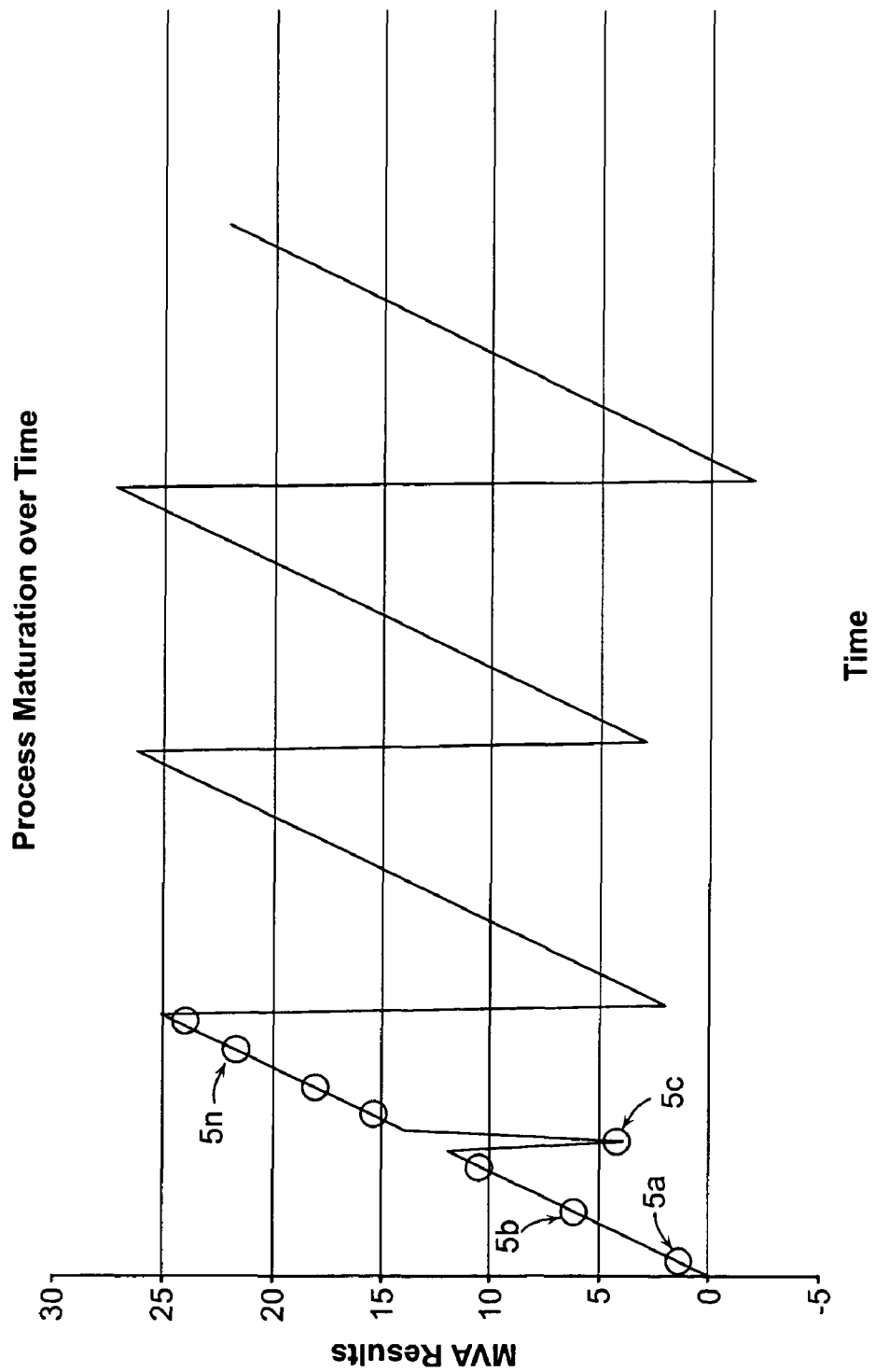
FIG. 2 is a diagram of process maturation for illustrating a method of generating a MVA reference model to account for process aging according to the prior art.
Figure 6:
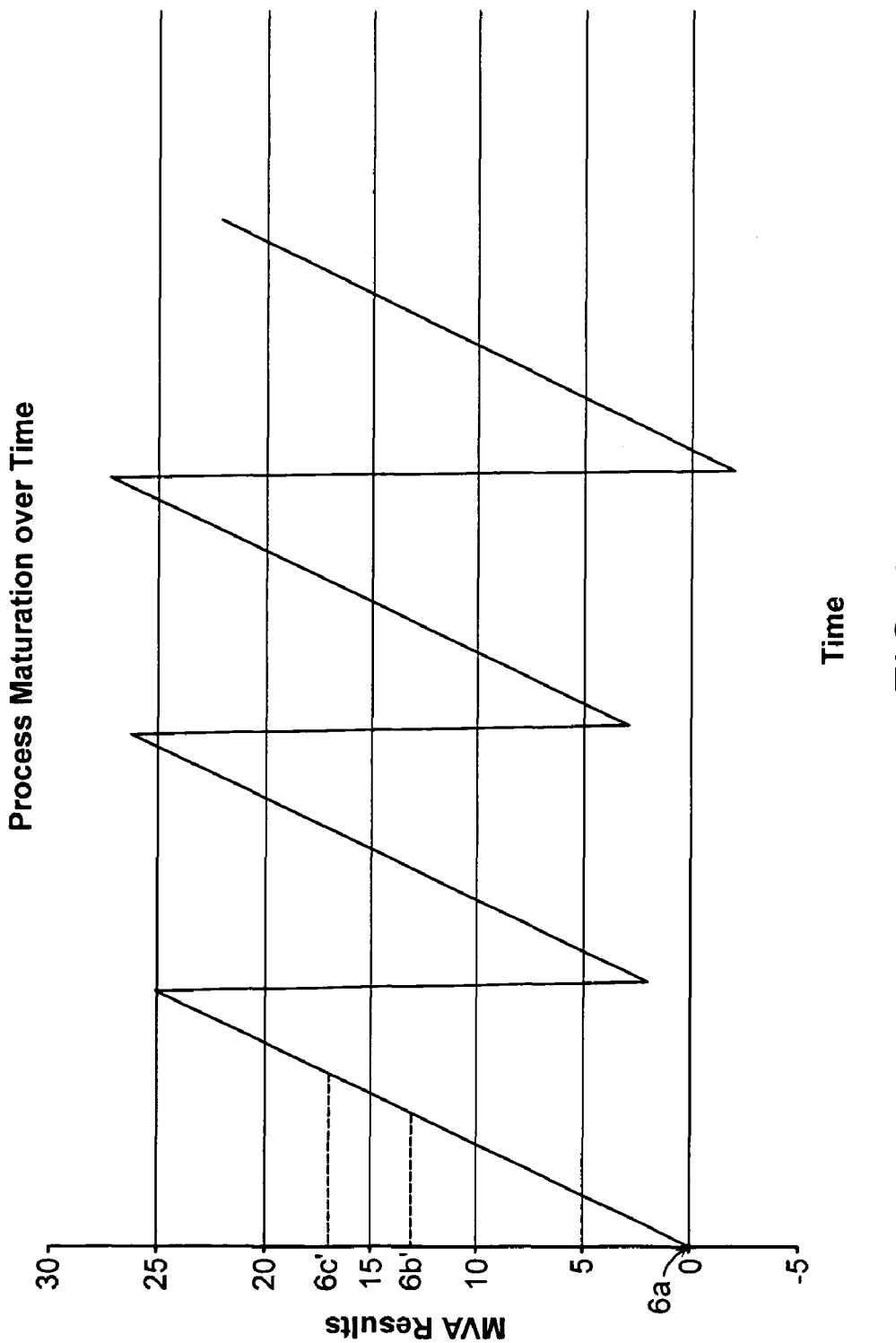
FIG. 6 is a state diagram illustrating process maturation and the corresponding MVA results and threshold values of the reference model after scaling to account for process maturation according to one embodiment.

For example, FIG. 6 is a state diagram illustrating process maturation and the corresponding MVA results and threshold values of the reference model after scaling to account for process maturation according to one embodiment. Specifically, MVA result 6a is the initial metric of the reference model, while MVA results 6b' and 6c' are the scaled thresholds corresponding to a new range of acceptable MVA results for subsequently measured states of the process environment. Thus, if the current state of the process environment corresponds to MVA result 5c as shown in FIG. 2 and the threshold range of MVA results is between 6b' and 6c', a fault is detected.

Referring back to FIG. 5 at step 70, the collected data on the monitored parameters for a single process event is used to generate MVA process metrics that are representative of the current state of the process environment. The current process model is generated in the same manner as the reference model. For example, in a semiconductor process, the resulting current process analysis condenses the data regarding the wafer process chamber during processing of a single wafer into a smaller set of independent abstract metrics that are representative of the current process environment.

At step 80, the one or more abstract metrics of the current process model are then compared against the corresponding threshold ranges defined in the reference model that have been scaled to account for process aging. In a semiconductor process, if the metrics of the current model fall within the defined threshold ranges of the reference model, the corresponding process environment, and consequently the corresponding processed wafer, is deemed to be acceptable. If one or more of the current model metrics fall outside of the defined threshold ranges, the corresponding process environment, and consequently the corresponding processed wafer, is deemed to be not acceptable and the wafer is disposed of accordingly.

Figure 7:
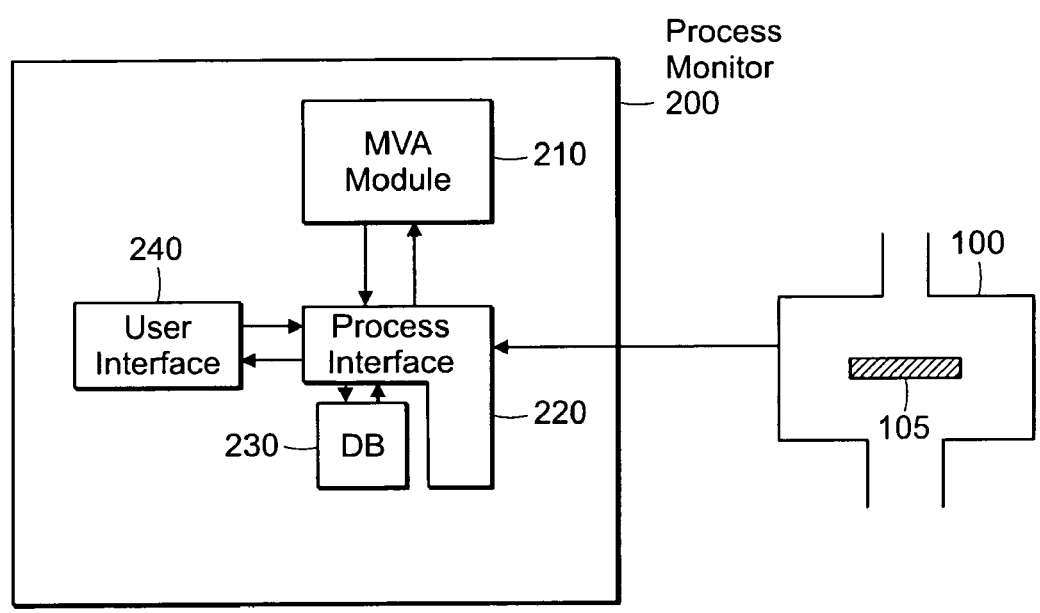
FIG. 7 is a system diagram illustrating a process monitor that implements self-correcting multivariate analysis reference modeling for use in analysis of dynamic parameters in a process environment according to one embodiment.

FIG. 7 is a system diagram illustrating a process monitor that implements self-correcting multivariate analysis reference modeling for use in analysis of dynamic parameters in a process environment according to one embodiment. The system includes a process environment 100 and a process monitor 200. In the illustrated embodiment, the process environment 100 is a wafer processing chamber in which wafers 105 enter the chamber for material deposition, etching or other semiconductor processes.

The process monitor 200 includes a MVA module 210, a process interface 220, a user interface 240, and a data base 230. The user interface 240 controls the operation of the MVA module 210 and the database 230 through the process interface 220. The process interface 220 collects data on monitored parameters of the process environment 100 and stores the data in the database 230 according to wafer ID. According to one embodiment, the process monitor 200 can be implemented using TOOLweb® Fault Detection and Classification (FDC) System from MKS Instruments with headquarters in Wilmington, Mass.

To generate a MVA reference model of the process, historical data associated with acceptable processed wafers is selected through the user interface 240. The process interface 220 retrieves the selected historical data from the data base 230 and forwards it to the MVA module 210. A set of one or more process parameters are designated as initial conditions through the user interface 240 which is also forwarded to the MVA module 210 via the process interface 220.

The MVA module 220 generates the MVA reference model using known multivariate analysis techniques. In particular, the resulting MVA reference model condenses the historical data for a large number of process parameters into a smaller set of independent abstract metrics that are representative of an acceptable process environment. Each abstract metric is further associated with a set of control threshold values defining a range of acceptable metric values deviating from the reference value. These threshold values are used as the basis for determining whether subsequent process environments, and consequently subsequently processed wafers, meet the standards for acceptability. The MVA modules can be implemented using SIMCA P+ or SIMCA QM+ MVA software from UMetrics. The reference model or an index to the reference model stored in the MVA module 210 is returned to the process interface 220.

To use the MVA reference model for fault detection of the process environment, the user interface 240 directs the process interface 220 to collect data for batch of individual processing events, such as a wafer processing event. For each event, the process interface 220 collects the process event data and stores the data at the database 230 according to wafer ID. The process interface 220 in parallel forwards the collected data for the process event, including the values of the designated initial condition parameter(s), to the MVA module 210 to calculate MVA results representative of the current state of the process environment 100. The MVA module 210 generates the current results and also scales the threshold values associated with the abstract metrics of the reference model relative to the one or more initial condition parameter values to account for process aging.

The MVA module 210 then compares the metrics of the current analysis to the corrected threshold values of the reference model. If the metrics fall within the scaled threshold ranges of the reference model, the corresponding process environment, and consequently in semiconductor processes the corresponding processed wafer, are deemed to be acceptable. If the current metrics fall outside of the defined threshold ranges, the corresponding process environment, and consequently the corresponding processed wafer, are deemed to be not acceptable and a process engineer is alerted by the process interface 220 through the user interface 240 to dispose of the wafer accordingly.

Figure 8:
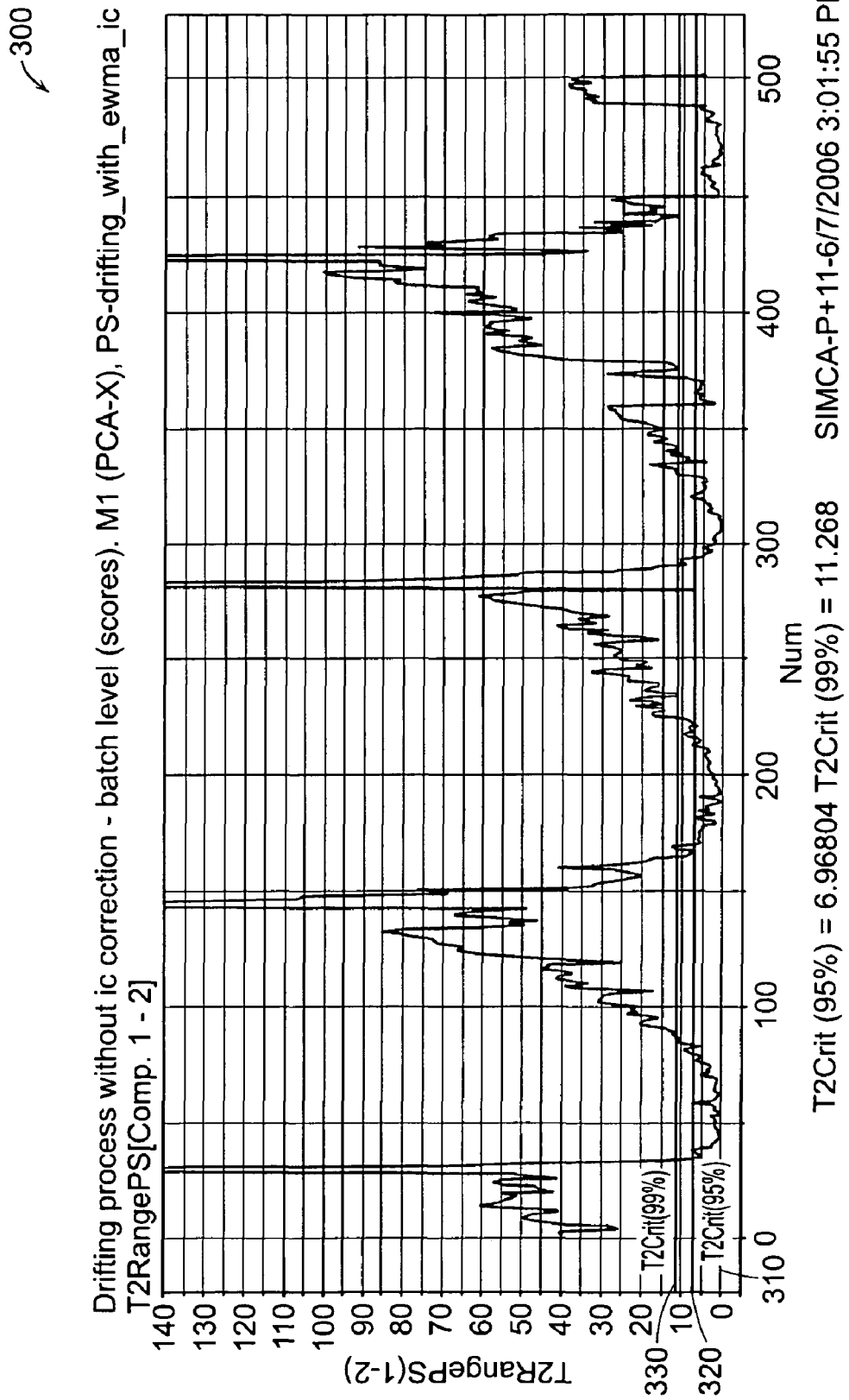
FIG. 8 is a multivariate analysis (MVA) graph that represents a semiconductor process over a period of silicon wafers using a static reference model.
Figure 9A:
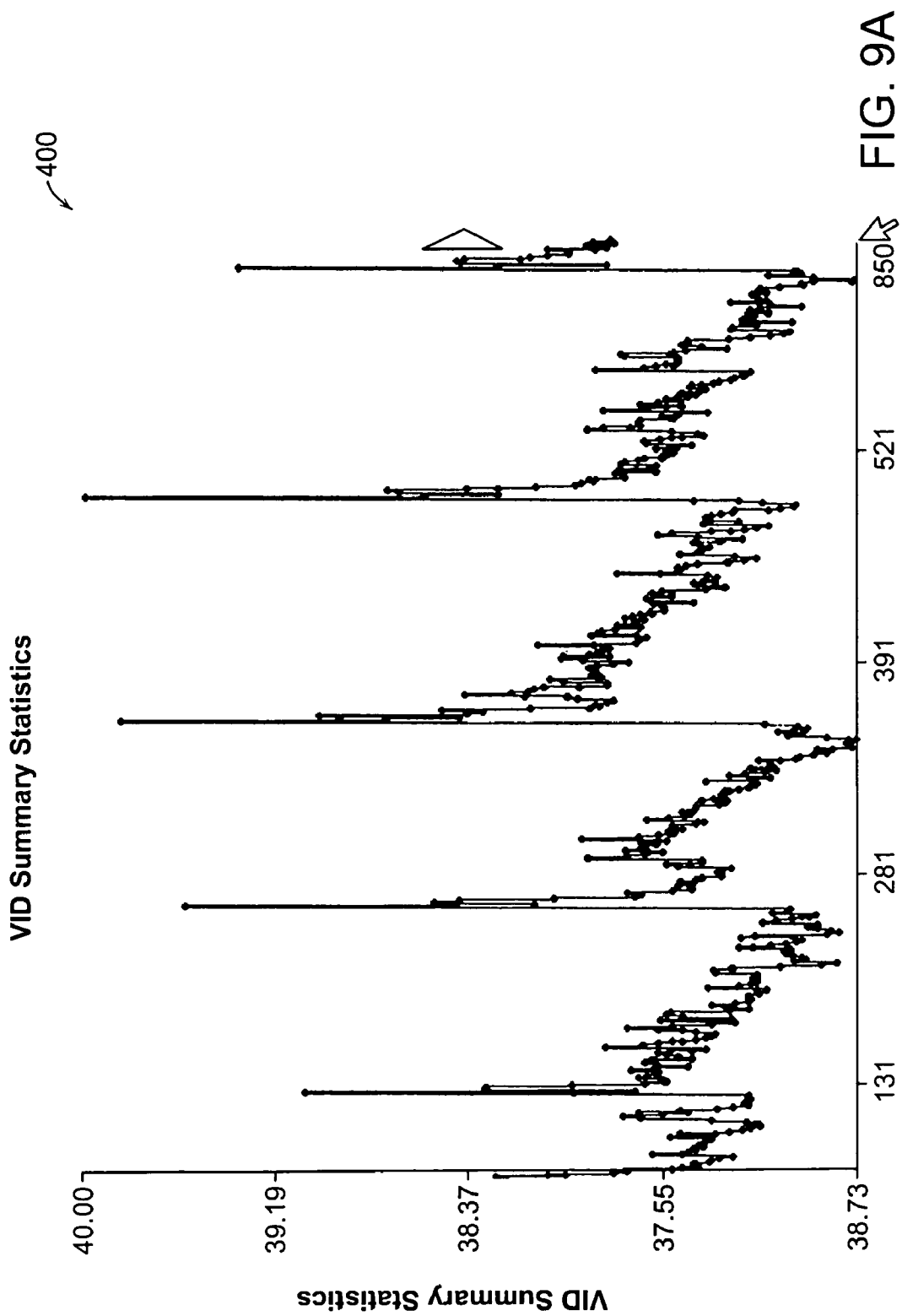
FIG. 9A is a graph that illustrates the actual values of a selected process parameter over a period of processed wafers.
Figure 10:
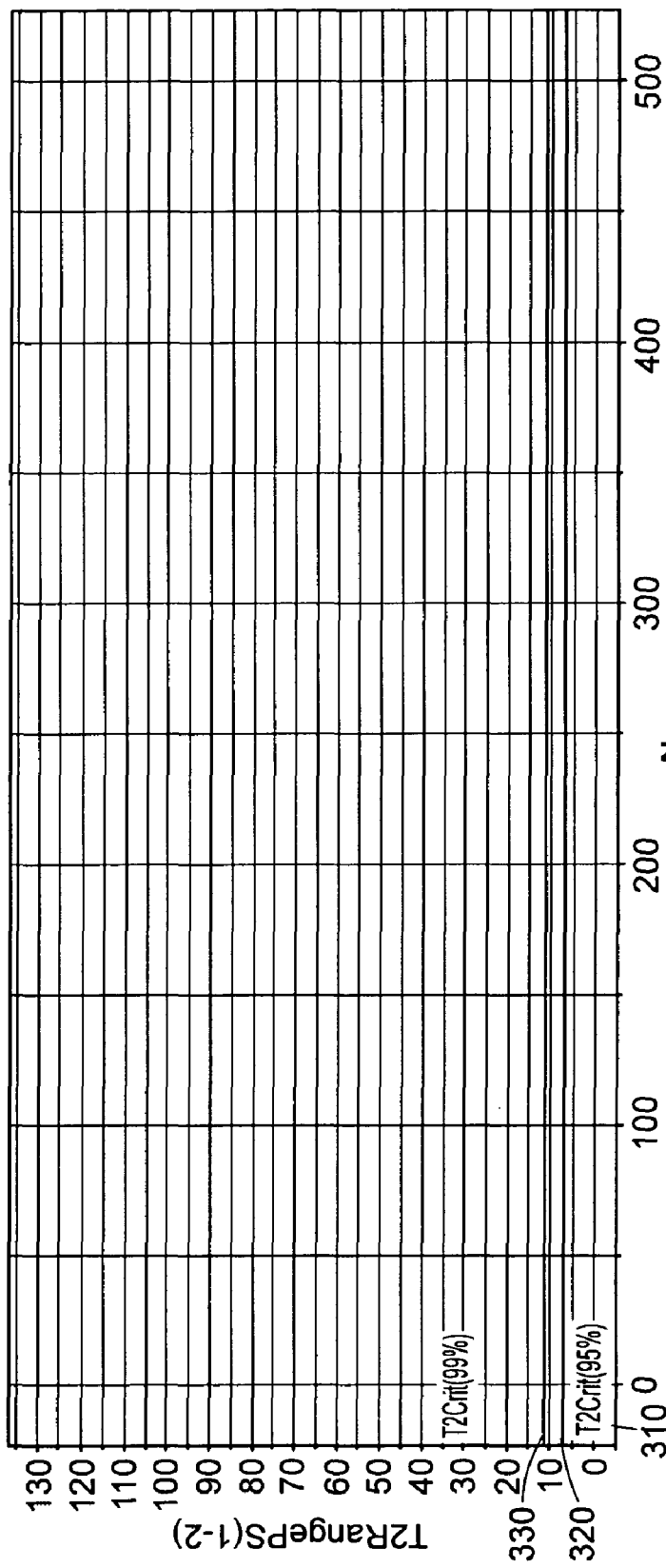
FIG. 10 is a multivariate analysis (MVA) graph that represents a semiconductor process over a period of silicon wafers using a self-correcting MVA reference model compensated using the delta values of FIG. 9C.

FIGS. 8-10 illustrate an actual example of drift correction using a self-correcting reference model for multivariate analysis. FIG. 8 is a multivariate analysis (MVA) graph that represents a semiconductor process over a period of silicon wafers using a static reference model. The semiconductor process is analyzed using Hotelling's $T^2$ multivariate analysis (MVA). The graph 300 illustrates the $T^2$ metric value of the semiconductor process along the Y-axis over a period of wafers as defined along the X-axis.

The graph also identifies critical limits 310, 320, 330 for alerting an operator to unsatisfactory operating conditions of the process environment, such as a wafer processing chamber. For example, the critical limits of this process include a 95% critical limit 310 configured as the "warning limit," a 99% critical limit 320, and an alarm level 330. The alarm level 330 is typically set at approximately 2× the warning limit in order to indicate error conditions associated with the semiconductor process. When the $T^2$ metric value exceeds the alarm level 330, the operator of the system or an automated process generally takes corrective action, such as cleaning the wafer processing chamber.

As shown in the exemplary graph 300, the Hotelling's $T^2$ multivariate analysis indicates that the semiconductor process is mostly out of control, such that significant drift exceeding the range of acceptable limits 310, 320, 330 appears between periodic maintenance of the process environment. In fact, the semiconductor process is not out of control. Rather, the detected drift is caused by normal process aging and maturation. However, because the multivariate analysis technique uses a static reference model generated from process parameters associated with a small set of "good" wafers, the reference model does not account for the normal periodic draft of the process. Any deviations caused by normal process aging and maturation are detected as an error conditions. Thus, this reference model is not representative of the normal drifting process.

To compensate for the process drift, without needing to expand the wafer set, a specific process parameter is identified that correlates with the Hotelling's $T^2$ multivariate analysis of the semiconductor process. FIG. 9A is a graph that illustrates the actual values of a selected process parameter over a period of processed wafers. In this example, the selected process parameter is the stage heater power. As shown in the graph 400, the actual values of the selected parameter drift according to a cyclical saw tooth pattern. This pattern is similar to the saw tooth pattern of the multivariate analysis graph 300. Thus, the selected process parameter is suitable for serving as an initial condition and compensating the multivariate reference model for the drift inherent in the semiconductor process. In particular embodiments, the selected process parameter can be derived from one or more process parameters.

Because the actual values of the selected process parameter of FIG. 9A are somewhat noisy, an exponentially weighted moving average (EWMA) signal can be generated in order to filter out the natural variance of the original signal and obtain a "cleaner" indication of the changes in the process parameter. For example, FIG. 9B is a chart of an exponentially weighted moving average (EWMA) signal for a sample of the selected process parameter values of FIG. 9A. As shown, signal 410 illustrates the actual wafer by wafer summary data for the selected process parameter. Signal 420 is the smoothed trend for the same summary data using an exponentially weighted moving average (EWMA). Other smoothing functions known to those skilled in the art can also be utilized. Alternatively, when a strongly correlating parameter is found, which is not influenced by significant random noise, the actual values of selected process parameter itself can be used as the compensating values for the model instead of the smoothed trend data.

FIG. 9C is a graph illustrating the change in the selected process parameter from wafer to wafer. For each wafer identified along the X-axis in the graph 500, a corresponding set of delta values representing changes in the actual or smoothed values of the selected process parameter from the previous wafer are identified along the Y-axis. For example, at wafer number 8, the set of delta values includes a first delta value 510b that represents the change in the smoothed summary statistic of the process parameter relative to the previous wafer number 7. Delta values 510a and 510c identify upper and lower bounds corresponding to realistic range of natural variance of the selected process parameter about delta value 500b. These delta values are then fed forward into the MVA reference model to scale, and thus compensate, the model for the next wafer to be processed by the chamber. Thus, these delta values are compensating values for the MVA model in anticipation of the process drift. When this compensation is implemented, the MVA model is aware of the process drift, and corrects the Hotelling's $T^2$ parameter appropriately. With respect to delta values 520, the values are a significant step up from the previous and subsequent delta value sets. Such deviation could be due to noise of other error condition. In such a case the delta values 420 are not used to scale the reference model. Rather, the delta values immediately prior to delta values 520 are re-used. If the delta values subsequent to delta values 520 maintain this increased step up in values, the system can alert a human operator to this condition and request confirmation that such deviation from a gradual change is expected or not.

Scaling includes any analytical adjustment based on the initial conditions. For example, in multivariate analysis, a process, such as a semiconductor process, is modeled in n-dimensional planes referred to as a hyper plane. The monitored values of the process for an initial set of "good" wafers are mapped to the hyper plane, such that a "cloud" or set of points are obtained to generate the MVA reference model. The MVA model is preferably built from a sufficiently large data set so that all normal process variance is represented in the data. The MVA reference model represents normal process behavior. The representative data points in hyperspace are projected onto a hyperplane that best fits the data points. Based on the data points projected onto this hyperplane, the center of the model is found. Once the model has been defined, changes in the one or more process parameters designated as initial conditions are used to define the appropriate shift in the center of the model in order to compensate for process drift that does not affect the quality of the process. In order to scale this MVA model according to process drift, the wafer to wafer change in value for a specific physical parameter can be used, such that the delta value(s) are defined as the initial condition(s) which are input into functions that model the movement of the central point to account for drift. Although the center of the model is allowed to move to compensate for the process drift, the model threshold relative to the corrected model center is not required to be corrected.

While scaling involves calculations based on selected process parameters to compensate for the process drift, there is yet another aspect within the multivariate calculation where the importance of any specific parameter can be weighted to increase or decrease its influence on the multivariate calculation. Thus, the process parameter selected as an initial condition to compensate for process drift can be weighted to provide sufficient drift compensation. In the event of more than one initial condition, the designated process parameters can be comparatively weighted to compensate for any interactions the two or more initial conditions might have.

FIG. 10 is a multivariate analysis (MVA) graph that represents a semiconductor process over a period of silicon wafers using a self-correcting MVA reference model compensated using the delta values of FIG. 9C. This compensated Hotelling's $T^2$ graph 600 is generated from the same data used to generated the non-compensated graph 300 of FIG. 8. As shown, the graph 600 includes a reduction in the drift of the Hotelling's T2 values, and most of the wafers fall under the 2× 95% T2 critical value, which is the typical alarm level 330.

The existing alarms 310, 320 and 330 can then be utilized as an indication of the need for periodic maintenance by the tool being monitored.

Although in the previous examples, a single process parameter is identified as the initial condition, there can be instances in which process drift is caused by multiple independent sources. In such instances the multivariate analysis model can be compensated using multiple initial conditions, each requiring selection of a corresponding orthogonal process parameter.

The above-described techniques can be implemented in digital electronic circuitry, or in computer hardware, firmware, software, or in combinations of them. The implementation can also be in another form that is not electronic in nature but performs the same outcome of filtering. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit (IC), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

While this invention has been particularly shown and described with references to preferred embodiments thereof, it will be understood by those skilled in the art that various changes in form and details may be made therein without departing from the scope of the invention encompassed by the appended claims.

What is claimed:

1. A method of process monitoring, comprising:
generating a multivariate analysis reference model of a process environment from data corresponding to monitored parameters of the process environment;
identifying at least one, but less than all, of the monitored parameters having an expected maturation path that correlates to an expected maturation path of the process environment;
collecting current process data corresponding to the monitored parameters, including the at least one identified parameter; and
mathematically manipulating the multivariate reference model based on the current process data limited to the at least one identified parameter to account for the expected maturation path of the process environment.

2. The method of claim 1 further comprising:
generating one or more current multivariate analysis process metrics that represent a current state of the process environment from the current process data; and
comparing the one or more current process metrics to the mathematically manipulated reference model to determine whether the current state of the process environment is acceptable.

3. The method of claim 1 wherein generating the reference model comprises:
generating a metric value and a set of threshold values about the metric that represent the state of the process environment, the set of threshold values defining a range of acceptable metric values associated with subsequent states of the process environment.

4. The method of claim 3 wherein mathematically manipulating the reference model comprises:
scaling the set of threshold values of the reference model based on the current process data of the at least one identified parameter to account for the expected maturation path of the process environment.

5. The method of claim 4 further comprising:
generating one or more current multivariate analysis process metrics that represent a current state of the process environment from the current process data;
comparing the one or more current multivariate analysis process metrics to the mathematically manipulated set of threshold values to determine whether the current state of the process environment is acceptable.

6. A method of semiconductor process monitoring, comprising:
generating a multivariate analysis reference model of a semiconductor process chamber from data corresponding to monitored parameters of the semiconductor process chamber;
identifying at least one, but less than all, of the monitored parameters having an expected maturation path that correlates to an expected maturation path of the semiconductor process chamber;
collecting current process data corresponding to the monitored parameters of the process chamber, including the at least one identified parameter; and
mathematically manipulating the multivariate reference model based on the current process data limited to the at least one identified parameter to account for the expected maturation path of the semiconductor process chamber.

7. The method of claim 6 further comprising:
generating one or more current multivariate analysis process metrics that represent a current state of the semiconductor process chamber from the current process data; and
comparing the one or more current multivariate analysis process metrics to the mathematically manipulated reference model to determine whether the current state of the process environment is acceptable.

8. An apparatus for process monitoring, comprising:
a multivariate analysis module capable of generating a multivariate analysis reference model of a process environment from data corresponding to monitored parameters of the process environment;
the multivariate analysis module being capable of receiving an identification of at least one, but less than all, of the monitored parameters having an expected maturation path that correlates to an expected maturation path of the process environment;
a process interface capable of collecting current process data corresponding to the monitored parameters, including the at least one identified parameter; and
the multivariate analysis module being capable of mathematically manipulating the multivariate reference model based on the current process data limited to the at least one identified parameter to account for the expected maturation path of the process environment.

9. The apparatus of claim 8 wherein the multivariate analysis module is capable of generating one or more current multivariate analysis process metrics that represent a current state of the process environment from the current process data and comparing the one or more current process metrics to the mathematically manipulated reference model to determine whether the current state of the process environment is acceptable.

10. The method of claim 8 wherein the multivariate analysis module is capable of generating a metric value and a set of threshold values about the metric that represents the state of the process environment, the set of threshold values defining a range of acceptable metric values associated with subsequent states of the process environment.

11. The method of claim 10 wherein the multivariate analysis module is capable of mathematically manipulating the set of threshold values of the reference model based on the current process data of the at least one identified parameter to account for the expected maturation path of the process environment.

12. The method of claim 11 wherein the multivariate analysis module is capable of generating one or more current multivariate analysis process metrics that represent a current state of the process environment from the current process data and comparing the one or more current multivariate analysis process metrics to the mathematically manipulated set of threshold values to determine whether the current state of the process environment is acceptable.

13. An apparatus for semiconductor process monitoring, comprising:
- a multivariate analysis module capable of generating a multivariate analysis reference model of a semiconductor process chamber from data corresponding to monitored parameters of the semiconductor process chamber;
- the multivariate analysis module being capable of receiving an identification of at least one, but less than all, of the monitored parameters having an expected maturation path that correlates to an expected maturation path of the semiconductor process chamber;
- a process interface capable of collecting current process data corresponding to the monitored parameters of the process chamber, including the at least one identified parameter; and
- the multivariate analysis module being capable of mathematically manipulating the multivariate reference model based on the current process data limited to the at least one identified parameter to account for the expected maturation path of the semiconductor process chamber.

14. The apparatus of claim 13 wherein the multivariate analysis module is capable of generating one or more current multivariate analysis process metrics that represent a current state of the semiconductor process chamber from the current process data and comparing the one or more current multivariate analysis process metrics to the mathematically manipulated reference model to determine whether the current state of the process environment is acceptable.

15. A process monitor, comprising:
- means for generating a multivariate analysis reference model of a desired process environment from data corresponding to monitored parameters of the desired process environment;
- means for identifying at least one, but less than all, of the monitored parameters having an expected maturation path that correlates to an expected maturation path of the process environment;
- means for collecting current process data corresponding to the monitored parameters, including the at least one identified parameter; and
- means for mathematically manipulating the multivariate reference model based on the current process data limited to the at least one identified parameter to account for the expected maturation path of the process environment.

16. The method of claim 1 further comprising weighting the at least one identified parameter used in mathematically manipulating the multivariate reference model.

17. The method of claim 6 further comprising weighting the at least one identified parameter used in mathematically manipulating the multivariate reference model.

18. The apparatus of claim 8 wherein the multivariate analysis module is capable of weighting the at least one identified parameter used in mathematically manipulating the multivariate reference model.

19. The apparatus of claim 13 wherein the multivariate analysis module is capable of weighting the at least one identified parameter used in mathematically manipulating the multivariate reference model.

20. The process monitor of claim 15 further comprising means for weighting the at least one identified parameter used in mathematically manipulating the multivariate reference model.

* * * * *